Figure 6:
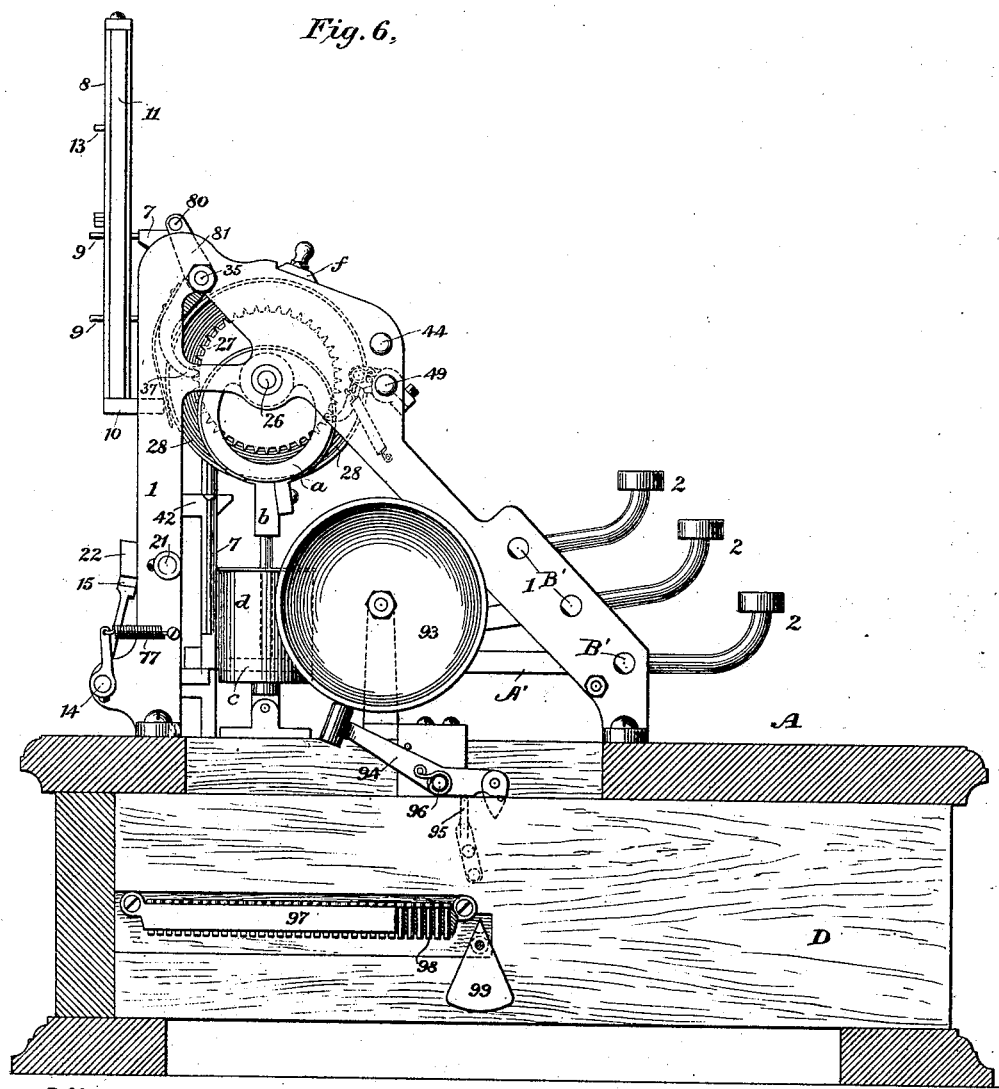

(No Model.)　　　W. W. & W. H. WYTHE.　　5 Sheets—Sheet 1.
CASH REGISTER AND INDICATOR.
No. 507,301.　　　　　　Patented Oct. 24, 1893.
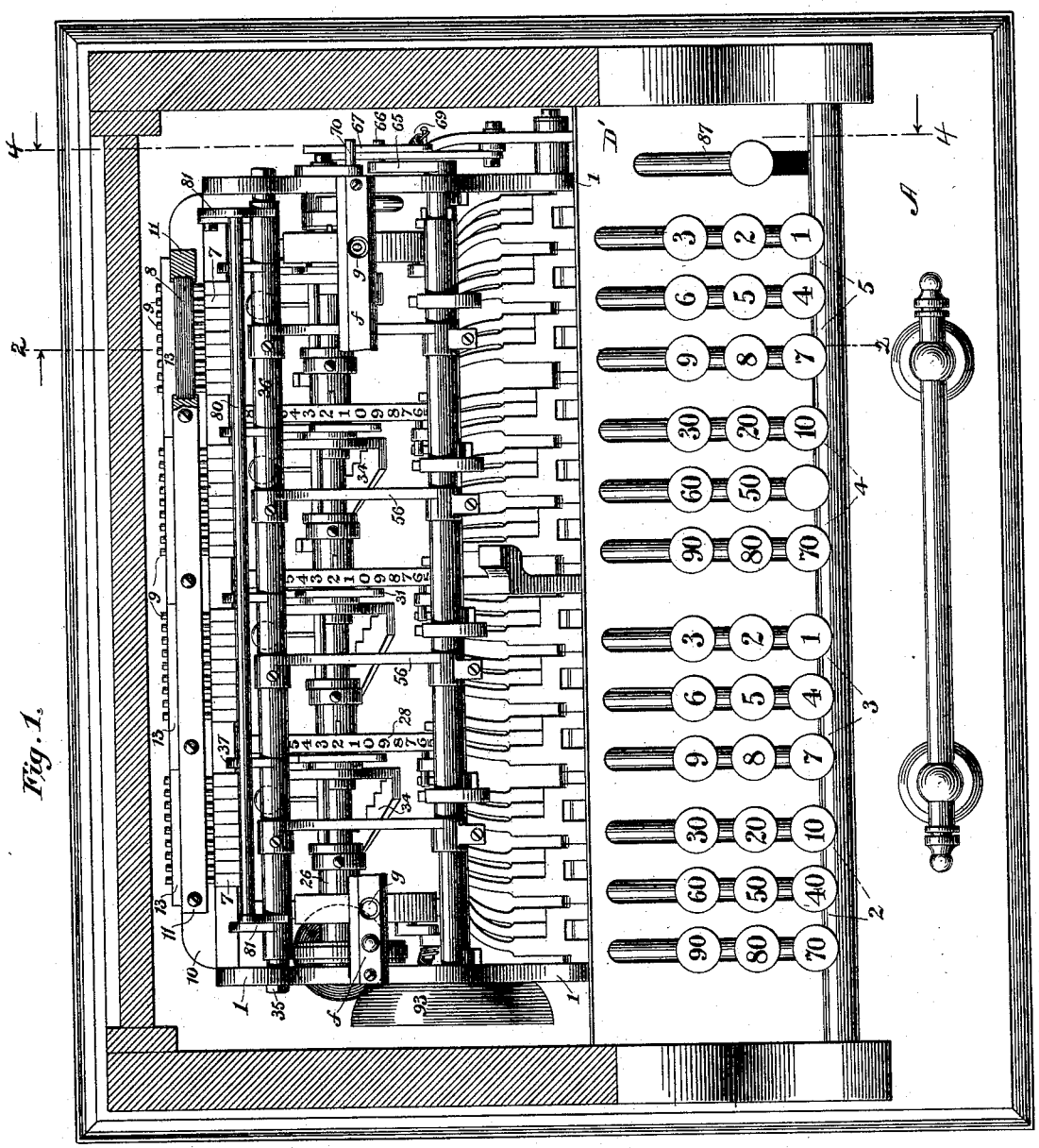
Witnesses
Geo. W. Breck.
Henry W. Lloyd.
Inventors
William W. Wythe
William H. Wythe

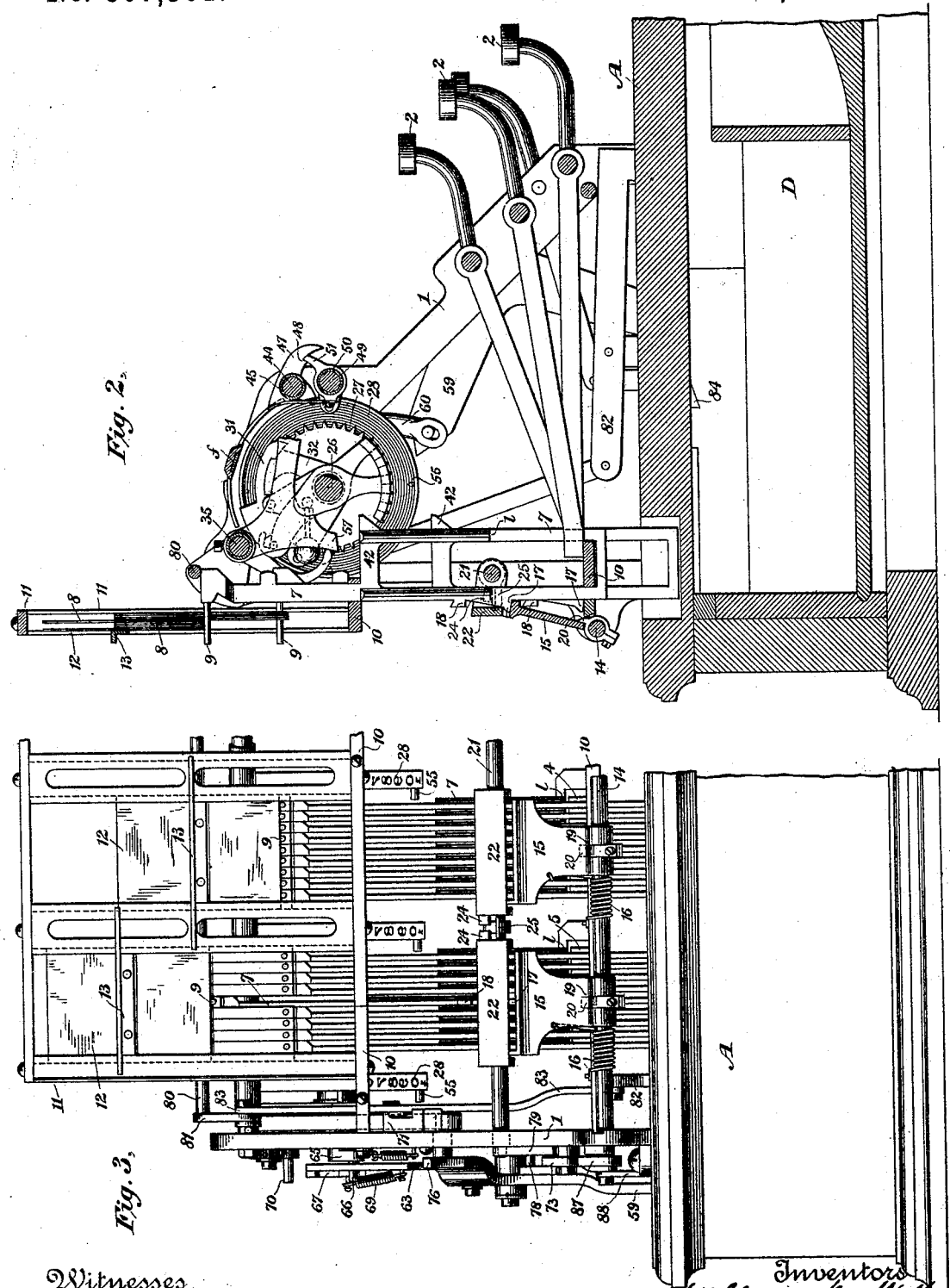

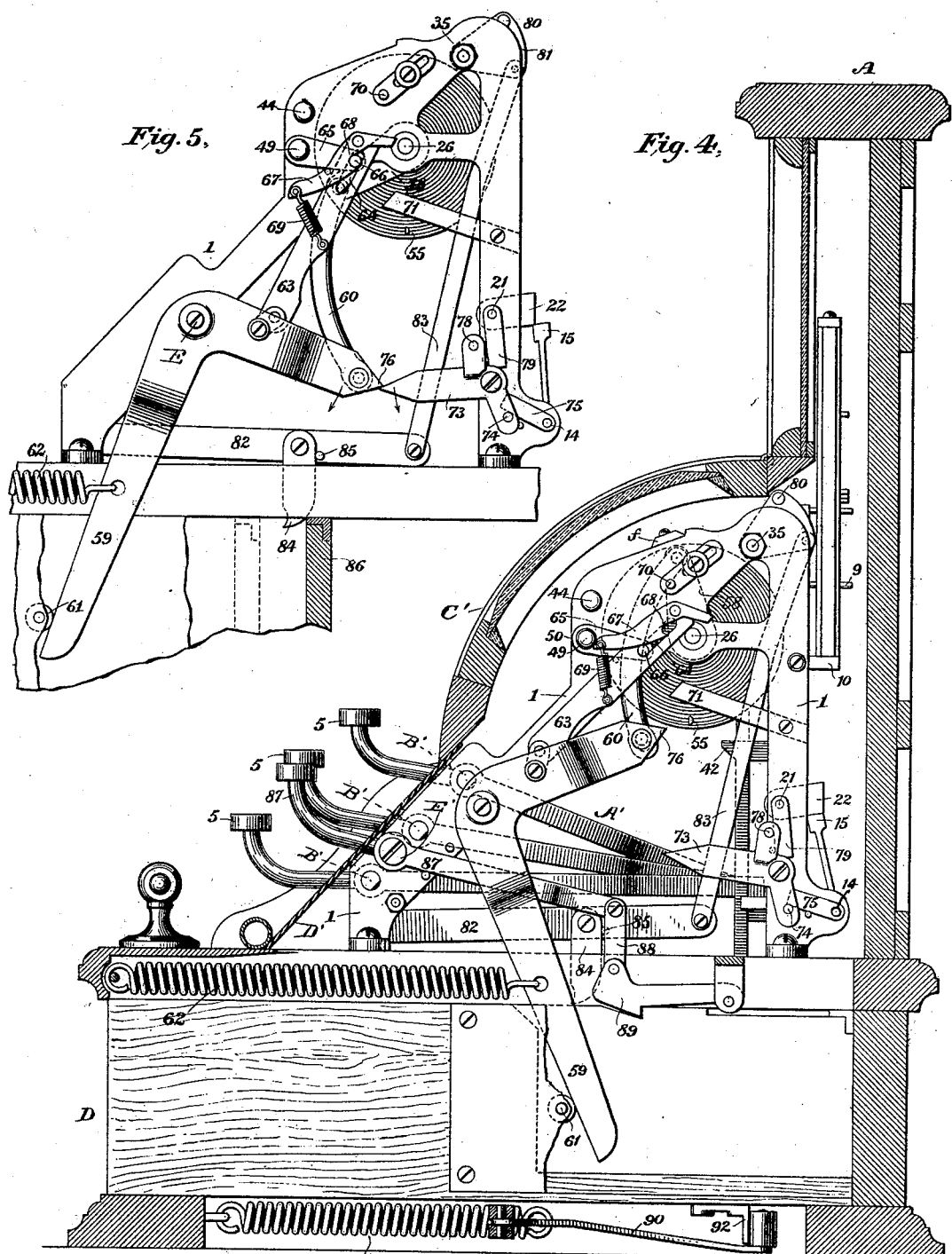

(No Model.) 5 Sheets—Sheet 4.

W. W. & W. H. WYTHE.
CASH REGISTER AND INDICATOR.

No. 507,301. Patented Oct. 24, 1893.

Witnesses
Geo. W. Breck
Henry W. Lloyd.

Inventors
William W. Wythe
William H. Wythe (No Model.) 5 Sheets—Sheet 5.
W. W. & W. H. WYTHE.
CASH REGISTER AND INDICATOR.
No. 507,301. Patented Oct. 24, 1893.
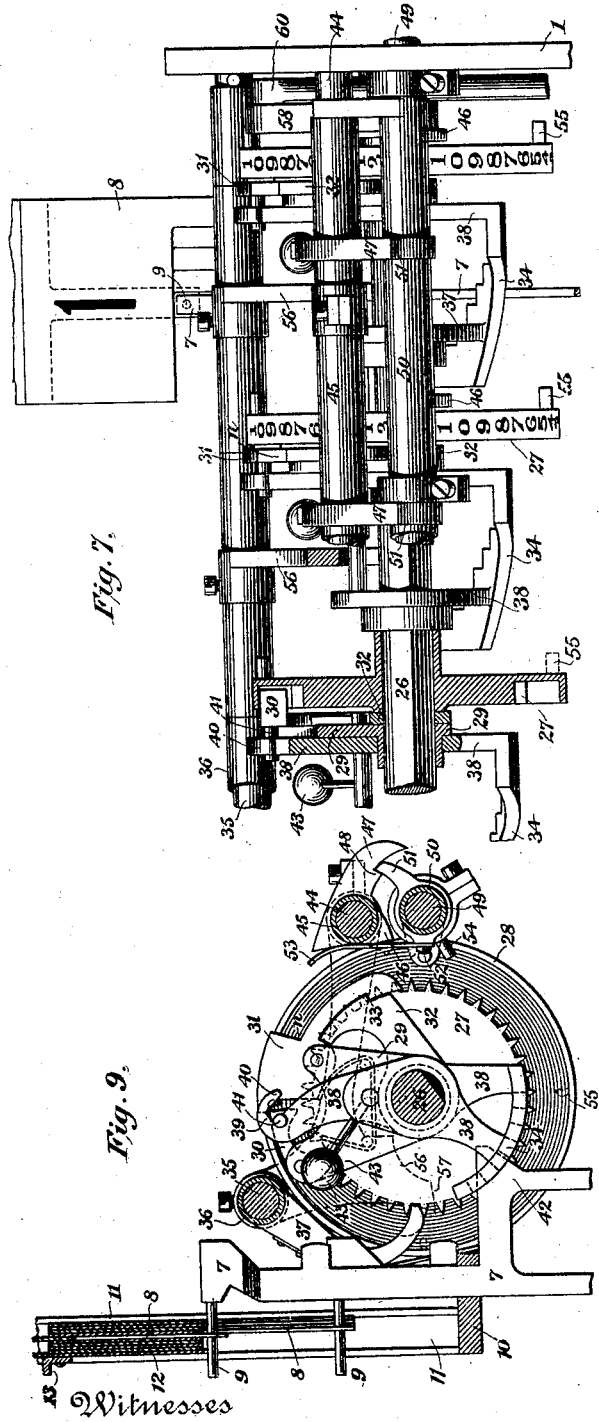
Witnesses
Geo. W. Breck
Henry W. Lloyd
Inventors
William W. Wythe
William H. Wythe

UNITED STATES PATENT OFFICE.

WILLIAM W. WYTHE AND WILLIAM H. WYTHE, OF ORANGE, NEW JERSEY, ASSIGNORS TO THE NATIONAL CASH REGISTER COMPANY, OF DAYTON, OHIO.

CASH REGISTER AND INDICATOR.

SPECIFICATION forming part of Letters Patent No. 507,301, dated October 24, 1893.

Application filed February 3, 1891. Serial No. 380,034. (No model.)

*To all whom it may concern:*

Be it known that we, WILLIAM W. WYTHE and WILLIAM H. WYTHE, both citizens of the United States, residing at Orange, in the county of Essex and State of New Jersey, have invented certain new and useful Improvements in Cash Registers and Indicators, of which the following is a description, reference being had to the accompanying drawings, forming part of this specification.

Our present invention relates to machines of the same general character as those shown and described in Letters Patent of the United States No. 384,490, of June 12, 1888, No. 401,725, of April 16, 1889, and No. 445,582, of February 3, 1891, the first two granted to William W. Wythe, one of the present applicants, and the last granted jointly to both of the present applicants; and the invention consists in certain improvements upon the aforesaid machines, involving new combinations and modes of operation, and novel constructions and arrangements of parts, which will be hereinafter fully described and particularly pointed out in the claims.

In the accompanying drawings Figure 1 represents a top plan view of the machine, with the upper part of the casing in horizontal section; Fig. 2 a vertical section of the machine upon the line 2—2 of Fig. 1, with the portion of the casing which incloses the working mechanisms removed; Fig. 3 a rear elevation of the left hand end of the machine, with the casing removed; Fig. 4 a vertical section upon the line 4—4 of Fig. 1, showing the entire casing in section; Fig. 5 a detail view of some of the parts shown in Fig. 4, in the position they occupy when the money drawer is opened; Fig. 6 a side elevation of the left hand side of the machine, with the casing removed and the base and drawer compartment in section; and Figs. 7 to 10 enlarged detail views of various parts of the registering mechanism.

The same letters and figures of reference are used to indicate identical parts in all the figures.

The principal working parts of the machine, supported in a suitable framework 1, rest upon a base A which in this instance forms the top of a drawer compartment or money box containing a forwardly and backwardly movable money drawer D, Figs. 2, 4 and 6. The operating keys consist of levers A' fulcrumed upon three horizontal rods B' supported by the framework 1 at the lower forward part of the machine, the upturned front ends of these levers, bearing the usual numbered finger buttons, resting in three horizontal rows, as seen in Fig. 1. There are thirty-six of these key levers, arranged in four distinct sets or groups, 2, 3, 4 and 5, of nine keys each, representing respectively units of cents, tens of cents, units of dollars and tens of dollars, in multiples of one from 1 to 9 inclusive, as seen in Fig. 1. At the right hand of these operating keys is a special key lever 87, having a blank finger button, for a purpose to be presently explained. The key levers are provided at their fulcrums with laterally extended hubs, as seen in the case of the upper row in Fig. 1, by which the keys are suitably spaced upon their fulcrum rods and guided in their vertical movements. The casing of the machine is provided with a hinged lid C' which may be swung upward to give access to the interior of the machine, and below and forward of this lid the front of the casing consists of an inclined plate D' in which is a series of vertical slots through which the front ends of the keys pass and have their play. In rear of their fulcrum rods the key levers are so bent laterally, as indicated in Fig. 1, as to bring the rear ends of the levers of each set or group into close proximity to each other, as seen in the case of the rear ends of the levers in groups 4 and 5 in Fig. 3. Their rear ends in normal position rest upon a cross plate 10 of the framework, Figs. 2 and 3. At the rear end of the keys of each group is a set of nine vertically sliding indicator supports or frames 7, each consisting of a vertically-elongated rectangular frame suitably guided in the cross plate 10 before referred to and a second similar cross plate above the first, and provided at its upper end with a vertically extending arm, also marked 7 in this instance, which is provided at its extreme upper end with a rearwardly projecting pin 9. Each group of nine of these sliding frames occupies substantially the same width of space as the rear ends of the nine keys which co-operate with them, the sliding frames being slightly separated and the rear ends of the keys occupying the spaces between them. When in their normal position the lower ends of these frames rest in a recess in the base A, Fig. 2. The forward vertical bar of each frame has formed upon one of its sides a shoulder or projection *l* which overlies the rear end of the adjacent key lever and when the frame is in normal position rests immediately above said lever, so that when the front end of the lever is depressed and its rear end lifted it will engage this shoulder and carry the sliding frame upward with it. In Fig. 2 the nearest frame is shown in elevated position. Suitable means, hereinafter described, is provided for temporarily holding the frames in elevated positions after they have been lifted by the operations of their corresponding key levers.

The indicators consist of a series of vertically sliding plates 8, arranged in four separate groups corresponding to the four groups of key levers. The indicator plates or tablets of each group are compactly arranged one immediately behind the other and their edges are confined in grooves in vertical guide ways 11, as seen more particularly in the case of the right hand group in Fig. 1. Each indicator plate has depending from it a narrow stem, as seen more particularly in Fig. 3, and each stem is provided with a perforation through which passes the rearwardly projecting pin 9 upon the corresponding indicator frame 7 heretofore described. The indicator plates are free to slide vertically in their guide ways 11 and whenever the front end of any key lever is depressed and its rear end and corresponding indicator frame 7 lifted the indicator plate connected to said frame will also be lifted to expose to view its indicating number at the usual transverse glass-covered window in the upper part of the casing.

As before stated there are nine indicator plates in each of the four groups, corresponding to the nine keys of the group, but in addition there is a tenth indicator plate 12 in each group, occupying the rearmost position in the group. These plates 12 are not provided with narrow depending stems, as are the plates 8, but consist simply of rectangular plates whose lower edges rest upon the pins 9 of the indicator frames of the respective groups, so that whenever any frame in a group is lifted, no matter which one, the indicator plate 12 will be lifted by its pin 9 to the position of the plate 12 in Fig. 2 and the left hand one in Fig. 3. Each of these plates 12 bears upon the forward side of its upper half a large cipher, but whenever the plate is lifted by the operation of a key in the group corresponding to it the indicator plate 8 which is connected with such key will be lifted in front of the plate 12 and hide such cipher. The ciphers are exposed to view only when the plates 12 are lifted in a different manner, which may now be explained. Each plate 12 has secured upon its rear side a rearwardly projecting plate or rib 13 extending horizontally the full width of the plate 12 and also projecting laterally beyond its edges, the ends of the plate 13 being suitably cut away, as seen in the case of the right hand one in Fig. 1, to permit them to clear the vertical guideways 11. These plates 13 are arranged in such relative vertical positions that the left hand end of each plate 13 will overlie the right hand end of the next adjacent plate 13 to the left of it, and thus when any plate 12 is lifted the laterally projecting right hand end of its plate 13 will lift the next adjacent plate 12 to the right. In this manner if the plate 12 of the extreme left hand group be lifted the plates 12 of all of the other groups will be lifted with it; if the plate 12 of the second group from the left be lifted the plate 12 of the extreme left hand group will remain at rest, while the plates 12 of the two right hand groups will be lifted; the lifting of the plate 12 of any group not affecting the plates 12 at the left of it, but lifting all of those at the right of it. The purpose of this provision of the cipher plates 12 and connection of them by the plates 13 is to cause ciphers to be shown at the right of the indicator which has been lifted by the operated key, instead of leaving a blank in such space or spaces. Thus, if one of the key levers in group 3, representing units of dollars, be operated, and an indicator bearing for instance the number 5 be lifted into view in the corresponding group, the two cipher indicators in the units and tens of cents groups at the right will also be lifted into view, so that five dollars will be clearly indicated, instead of merely exposing the number 5.

The means for temporarily holding the indicator frames or plates in elevated position may now be described as follows: Loosely mounted upon a rock-shaft 14 extending horizontally across the lower end of the rear side of the machine, Figs. 2 and 3, are four upwardly extending indicator-supporting plates 15, one immediately in rear of and of approximately the same width as each group of indicator frames 7 and pressed by a spring 16 toward said frames. The rear vertical bar of each frame 7 is provided with a rearwardly projecting shoulder 17 having an inclined upper rear surface and an approximately horizontal under surface. When any indicator frame is lifted this shoulder 17 will bear against the upper edge of the corresponding supporting plate 15 and press the latter rearward against the stress of its spring 16 until the shoulder clears the upper edge of the plate, whereupon the latter will spring forward and catch under the shoulder and support the frame and its connected indicator plate in elevated position when the operated key lever is released. Secured upon the rock-shaft 14 immediately in front of each plate 15 is a lug 20, by means of which when the shaft is rocked rearward all of the plates 15 will be carried rearward with it and any indicator frames which happen to be in elevated position will be released and drop back to their normal positions. When the plates 15 are thus thrown rearward by turning the shaft 14 they are held in rearward position, even after the shaft has returned to its normal position, by means of detaining plates 22, of which there is one above each plate 15, loosely hung by side arms at its opposite ends upon a shaft 21. When the parts are all in their normal position of rest and no indicator is exposed to view all of the plates 15 will be held in this rearward position by the plates 22. When any indicator frame is then lifted a lug 18 upon its rear side, above its shoulder 17, will first engage the plate 22 and lift it to the position shown in Fig. 2, and then clear its lower edge and pass on upward. This will release the particular plate 15 corresponding to this group and its spring 16 will throw it forward against the inclined surface of the rising frame 7 between the lug 18 and shoulder 17. The shoulder 17 of the rising frame will press the upper edge of the plate rearward and pass it, and the plate will then spring forward beneath the shoulder and support the lifted frame, and the flanged edge of the plate 15 will catch over the lugs 18 of all the frames 7 of that group which remain at rest and lock them from movement until it is thrown rearward again by the subsequent rocking of the shaft 14 in the manner hereinafter described. The plates 15 of all the groups in which no keys are operated will remain held in their rear positions by their detaining plates 22.

The means for rocking the shaft 14 at each operation of the machine, to throw the plates 15 rearward and release the exposed indicators, may now be described as follows: Pivoted to the right hand side of the framework 1 at E', Figs. 4 and 5, is a bent lever 59, whose lower end extends downward through an opening in the base A and into the drawer compartment, where it bears against a roller 61 carried by the drawer. A strong coiled spring 62 connected at its forward end to a fixed point within the base A and at its rear end to the lower arm of the lever 59 tends to pull the latter forward and throw the upper rear end of the lever downward. When the drawer D is closed and locked it holds this lever in the normal position shown in Fig. 4 against the stress of the spring 62. The drawer is locked, when closed, by a latch 89 which engages a shoulder formed on the upper edge of the side wall of the drawer. This latch 89 is connected by a link 88 to the rear end of the special key lever 87 heretofore described, Fig. 1, and whenever the front end of said key lever is depressed the latch 89 is disengaged from the drawer and the latter is thrown open by the action of the spring 62 and a second spring 91 beneath the drawer and hereinafter described. The upper arm of the lever 59 has a pointed rear end 76 which is adapted to engage the forward pointed end of a bell-crank lever 73 pivoted to the framework at the lower rear side of the machine, and provided with a laterally projecting pin 74 which engages an arm 75 fast upon the end of the rock-shaft 14. When the money drawer is released and opened and the rear end of the lever 59 thrown downward by the action of the spring 62, Fig. 5, it will engage and rock the bell-crank lever 73 and the pin 74 will lift the arm 75 and rock the shaft 14, against the stress of a spring 77 connected to an arm fast upon the opposite end of the rock-shaft, Fig. 6, and cause the lugs 20 to throw the plates 15 rearward and release the exposed indicators and permit the detaining plates 22 to drop between the upper edges of the plates 15 and the rear sides of the indicator frames 7. When the pointed rear end of the lever 59 clears the end of the lever 73 the spring 77 will restore the rock-shaft 14 and lever 73 to normal position, the arm 75 resting against a pin upon the framework. When the drawer is closed and the rear end of the lever 59 thrown upward again it will engage and lift the front end of the lever 73 as it passes, and after it has cleared it the lever 73 will drop back to normal position by reason of the gravity of its forwardly projecting arm. In this manner at each opening of the money drawer by the special key 87 all of the exposed indicators are released and dropped from view and the parts set for the operations of the indicating and registering keys and the lifting of new indicators into view.

The shaft 21 upon which are loosely hung the detaining plates 22 is provided with two rearwardly projecting lugs 25, Figs. 2 and 3, one of said lugs projecting between the adjacent ends of the two left hand plates 22 in Fig. 3, and the other projecting between the two right hand plates, not shown. The two plates 22 in Fig. 3 are provided upon their adjacent ends with two lugs 24 overlying the lug 25, and the two other plates 22 are provided with similar lugs overlying the other lug 25 upon the shaft 21. It results from this that whenever the shaft 21 is rocked forward the lugs 25 will lift the plates 22 and release the plates 15 and permit the springs 16 to throw the latter forward and cause them to catch over the locking lugs 18 upon the indicator frames 7, and thereby lock from movement all of said frames which have not been lifted by the operations of the keys and remain at rest in normal position. The shaft 21 is rocked, to accomplish this result, by the closing of the money drawer, after the keys necessary to effect the desired indication and registration have been operated and the proper indicator frames 7 lifted and caught by their corresponding plates 15. As before explained, when a key in any group is operated the lug 18 upon the rising indicator frame 7 will lift the detaining plate 22 of that particular group and permit the plate 15 to be thrown forward to catch under the shoulder 17 of the lifted frame 7 and support it and its connected indicator plate in elevated position, but the plates 15 and 22 in the groups in which no keys are operated are not affected by the operations of the keys in other groups, and such plates 15 remain in their rear position with the plates 22 interposed between them and the indicator frames 7. When all of the keys necessary to effect the desired indication and registration have been operated, however, and the money drawer is closed, it is desirable that all of the indicator frames and keys remaining in normal position, both in operated and unoperated groups, shall be locked from movement until the money drawer is opened preparatory to another operation of the machine, and to this end the shaft 21 is arranged to be rocked by the closing of the drawer, to lift the plates 22 and release the plates 15 corresponding to the unoperated groups, in the following manner, reference being had to Figs. 4 and 5: The shaft 21 has fast upon its right hand end a pendent arm 79 adapted to be engaged by a pin 78 projecting laterally from an upper extension of the bell-crank lever 73 or a plate secured thereto. When the drawer is opened the pointed end 76 of the lever 59 passes below the front end of the lever 73, as before explained, and the lever 73 is returned to normal position by the action of the spring 77 applied to the rock-shaft 14; and when the drawer is closed the rear end of the lever 59 in rising will lift the front end of the lever 73 until it clears and passes it. In so doing the front end of the lever 73 will be necessarily lifted higher than the position it normally occupies, Fig. 4, and the pin 78 will press the arm 79 rearward and rock the shaft 21 and cause its lugs 25 to lift the plates 22 which belong to the groups containing no operated keys and thereby release the plates 15 corresponding to such groups and permit their springs 16 to throw them forward.

From the foregoing description it will be seen that in the operation of the indicating mechanism of our machine the special key 87 is first depressed, to release and open the money drawer, which will cause the lever 59 to rock the shaft 14 and disengage the plates 15 from the shoulders of the elevated indicator frames, and thereby release all of the exposed indicators and permit them to drop out of sight; then the proper keys in the several groups are operated, to lift their respective indicator frames and cause the shoulders 17 of the latter to be caught and held by the corresponding plates 15, and their connected indicators to be exposed to view, and all of the unoperated keys in such groups to be locked by the flanged upper edges of such plates 15; and then the money drawer is closed and the lever 59 caused to rock the shaft 21, to release the plates 15 belonging to the groups in which no keys were operated, and permit the springs 16 to throw such plates forward into position to lock the indicator frames and keys of such groups. The operation of this portion of the machine thus consists in first opening the money drawer, then depressing the proper keys, and then closing the drawer; as will be readily understood.

For the purpose of preventing the drawer being closed, after it has been released and opened and the exposed indicators dropped out of view, without first operating some one of the keys to effect a new indication, there is provided an automatic locking device which is controlled by the keys and operates to prevent closure of the drawer until it has been moved out of the path thereof by the operation of a key. This locking device may be described as follows: Loosely hung upon a rod 35 fixed in the upper part of the framework 1 are two plates 81, one near each end of said rod, Figs. 1, 2, 4, 5 and 6. These two plates are connected by a cross rod 80 which overlies the upper ends of all of the indicator frames 7, as seen in Fig. 2. Pivoted to one of these plates 81, in this instance the left hand one, is the upper end of a link 83, Figs. 4 and 5, whose lower end is pivoted to the rear end of an arm 82 which is pivoted to the framework at its forward end. Pivoted to and depending from this arm 82 is a locking dog 84, which extends down through the base A, with its lower end projecting into the path of the rear wall 86 of the drawer. This pendent dog is free to swing in one direction, but is prevented from moving in the opposite direction by a pin 85 upon the arm 82. When the money drawer is released and thrown open its rear wall freely rides under the lower end of the dog 84, lifting it out of the way as it passes, but after it has passed the dog and the latter has swung back to normal position the lower end of the dog will prevent the drawer being closed so long as it remains in the path of the latter. Whenever any key is operated and an indicator frame 7 lifted the rod 80 will be lifted by said frame and the link 83 will draw the rear end of the arm 82 upward and carry the dog 84 out of the path of the drawer, whereupon the latter will be free to be closed. In this manner, after each opening of the drawer it is necessary to operate some one of the keys and expose an indicator before the drawer can be closed again.

Having now described the indicating mechanism of the machine, the registering mechanism may be next explained: Journaled in the upper middle portion of the machine and extending approximately across the same is a rock-shaft 26. This shaft has fast upon it an arm 58 which is connected by a link 60 to the upper rear end of the bent lever 59 above described, Figs. 4 and 5. When the money drawer is released and opened and the lever 59 moved by the spring 62, in the manner described, the shaft 26 will be rocked forward a definite distance, in this instance something more than a fourth of a revolution, a stop plate 71 in the path of the arm 58 serving to limit such movement, and when the drawer is released it will return to normal position. In this manner at each opening and closing of the drawer the shaft 26 will be rocked forward and back. Loosely mounted upon the shaft 26 is a series of registering wheels 28, Fig. 1, one wheel for each of the four groups of keys, and one or more supplemental wheels at the left hand side of the machine. Each of the wheels 28 consists of a circular disk having a circumferential flange or band secured to its periphery, which band bears several series of numbers, in this instance four series, each occupying one-fourth of the circumference of the wheel and its numbers representing the nine digits and a cipher. Secured to the side of each wheel 28 is a toothed wheel 27. Loose upon the shaft 26 beside each wheel is a pawl-carrying plate 29, Figs. 9 and 10. This plate has pivoted to it two pawls, 30 and 31, the former being pivoted to the plate near its upper rear corner and adapted to co-operate with the toothed wheel, and the latter being pivoted to the plate at its upper forward corner and provided with a forwardly and downwardly extending hook adapted to co-operate with a shoulder 33 upon an arm 32 which is fast upon the shaft 26 beside the pawl-carrying plate 29, there being one of these arms 32 fast upon the shaft 26 beside each registering wheel. It results from this construction that whenever the shaft 26 is rocked forward by the opening of the money drawer, in the manner before explained, the arm 32 will carry forward the pawl-carrying plate 29 and pawls with the shaft, and if the pawl 30 be allowed to engage the toothed wheel 27 it will turn the wheel forward with the shaft. Inasmuch as the rock-shaft and parts connected to it have a definite forward movement at each operation it will be seen that if the pawl 30 be engaged with the toothed wheel at different points in such movement the registering wheel will be carried forward from the point of such engagement to the end of such movement and different values be registered according to the different points of engagement of the pawl with the toothed wheel. In the normal position of the parts the pawl 30 is held out of engagement with the toothed wheel 27 by means of a laterally projecting pin 41 carried by the pawl and engaging a recess in a hook 39 formed upon the upper end of the upwardly extending side arm 38 of a swinging frame loosely hung upon the shaft 26. There is one of these swinging frames for each registering wheel and its co-operating group of keys and indicators, and each frame is composed of two pendent arms 38 hung upon the shaft 26 and connected at their lower ends by a curved and stepped or graduated plate 34, Figs. 7 and 8. Each of these plates 34 is provided with nine steps, the succeeding steps receding in regular order from the plane of the rearmost step at the left hand end of the plate to the plane of the foremost step at the right hand end of the plate, as seen in Fig. 8, which is a plan view, partly in section. It results from this that if the graduated plate 34 be swung rearward its left hand rearmost step will reach a given transverse line when the plate has moved a certain distance, the second step will reach such line when the plate has moved one unit of distance more, the third when it has moved two units more, and so on through the series. Now, each of the indicator frames 7 before described is provided at its upper forward corner with a projecting stop 42, the frames 7 of each group standing in line with one of the graduated plates 34 of the swinging frames, with their stops 42 in line with the respective steps of such graduated plate. When any indicator frame is lifted its stop 42 is carried into the path of travel of the corresponding step upon the swinging frame, and when the frame has been swung rearward a distance determined by such stop it will be arrested thereby. In the normal position of the parts the extreme left hand stop of each plate 34 stands at a distance from the vertical line of its co-operating stop 42 which may be taken as a unit of distance, and the second step stands at two units of distance from the line of its co-operating stop, and so on through the series, the last step on the right standing nine units of distance from the line of its co-operating stop. Now, the engagement of the pin 41 upon the pawl 30 with the recess in the hook of the upwardly extending arm 38 of the swinging frame, Figs. 2 and 9, is such that when the shaft 26 is rocked forward from the normal position shown in Fig. 2 and the pawl-carrying plate and the pawls carried with it the pin 41 will carry the hooked arm 38 with them and throw the swinging frame rearward until the plate 34 strikes the stop 42 of the indicator frame which has been lifted, as in Fig. 9, whereupon said swinging frame will be arrested, the pin 41 forced out of its seat in the hook 39 and the pawl 30 thrown into engagement with the toothed wheel 27, as seen in Fig. 10, by the action of a spring bearing against its tail end (shown in dotted lines in Figs. 9 and 10), the projecting nose 40 of the hook 39 also acting upon the pin 41 to insure the engagement of the pawl 30 with the tooth of the wheel. From the point of such engagement, therefore, on to the end of the forward movement of the rock-shaft and connected parts, or to a fixed point of disconnection of the pawl-carrying plate and pawls from the rock-shaft hereinafter described, the toothed wheel 27 and registering wheel will be carried with them. Each of the wheels 27 is provided with forty teeth, and the movement of the rock-shaft 26 from normal position to the point at which the pawl-carrying plate 29 is disconnected from it is substantially one-quarter of a revolution. If, therefore, the pawl 30 be engaged with the toothed wheel 27 at the beginning of the forward movement of the rock-shaft the wheel would be turned a quarter of a revolution with the shaft, but if the pawl be engaged with the wheel after the shaft has completed one-tenth of its quarter revolution the wheel will be turned nine-tenths of a quarter revolution, if it be engaged with the wheel after the parts have completed two-tenths of the quarter revolution it will carry the wheel with them during the remaining eight-tenths of their movement, and so on. Inasmuch as the swinging frame is arrested by the stop of the left hand indicator frame when the swinging frame is moved one unit of distance, the pawl 30 will be thereby engaged with the wheel 27 when the shaft 26 and connected parts have completed one-tenth of their quarter revolution, and will turn the wheel 27 with them during the remaining nine-tenths of such movement, and as the left hand indicator frame is actuated by the 9 key in each group the value of such key will be added upon the registering wheel by its nine-tenths of a quarter revolution; and so on with all of the keys and indicator frames of each group. After the swinging frame has been arrested by engagement with the stop of the indicator frame 7 it is free to return to normal position, and is so returned by the gravity of a counter-weight 43 carried by a rod secured to one of the arms 38 above the shaft 26, Fig. 10.

From the foregoing description it will be understood that the operation of this portion of the registering mechanism is as follows: Assuming all of the indicator frames and indicators to be in their lowest position of rest, with no indicator exposed to view, and the registering wheels set at zero for the beginning of a day's business, when the special key 87 is depressed and the drawer released and thrown open the rock-shaft 26 will be rocked forward, carrying the plate 29 and pawls 30 and 31 with it until said plate is disconnected from the shaft at the end of a quarter revolution by the means to be hereinafter described; during this forward movement of the parts the pawl 30 will be held out of engagement with the registering wheel by the engagement of the pin 41 with the recess in the hooked arm 38 of the swinging frame. At the end of the forward movement the plate 34 of the swinging frame will strike a fixed support 57 on the lower end of a plate 56 fast upon and depending from the fixed shaft 35, Figs. 7, 9 and 10, and be thereby disconnected from the parts moving with the rock-shaft and reset to the normal position shown in Fig. 10 by its counter-weight 43. The operator will then depress the front ends of the proper key-levers and thereby set the stops 42 of their respective indicator frames in position to arrest the swinging frames upon their next forward movement, at the same time exposing the proper indicators to view. When the drawer is now closed the rock-shaft 26 will be rocked back to normal position, carrying the pawl-carrying plate and pawls with it, the pawl 30 slipping idly backward over the teeth of the wheel 27. Nothing will have been registered by these several operations, but upon the next opening of the drawer and forward movement of the rock-shaft the swinging frames will engage the stops 42 of the lifted indicating frames at different points determined by the values of the operated keys, the pawls 30 be disengaged from the hooked arms 38 of the swinging frames at such different points and engaged with the toothed wheels 27, and carry said wheels forward with the rock-shaft from such points to the end of its quarter revolution, and thereby register the values of the respective operated keys. In this manner the amounts indicated at any given operation of the machine are added upon the registering wheels by the opening of the money-drawer preparatory to the next succeeding operation of the machine.

The means for arresting the pawl-carrying plate 29 and disconnecting the pawl 31 from the arm 32 of the rock-shaft at the end of the forward quarter revolution of the latter may now be described: Extending transversely across the front of the entire series of registering wheels are two shafts 44 and 49, one above the other. Loose upon the shaft 44 is a series of sleeves 45, one for each registering wheel, Fig. 7, and each having fast upon it a forwardly extending latch-arm 47 provided upon its under side with a shoulder 48. These arms 47 are located upon the sleeves 45 near their left hand ends and are arranged to co-operate with short arms 51 fast upon the right hand ends of sleeves 50 loose upon the subjacent shaft 49. The engagement of the arms 51 with the shoulders 48 prevents the sleeves 50 being turned rearward upon the shaft 49, and each sleeve 50 is provided near its end opposite its arm 51 with a short downwardly and rearwardly projecting arm which carries a laterally projecting pin 52, Fig. 8. The right hand end of this pin stands in the path of travel of a shoulder $n$ formed upon the pawl 31 which co-operates with the adjacent registering wheel, and when the rock-shaft has completed a forward quarter revolution the shoulder $n$ will strike the pin 52 and arrest the pawl 31, at the same time rocking it upon its pivotal support on the plate 29 and disengaging its hooked end from the shoulder 33 of the arm 32 of the rock-shaft, and thereby disconnecting the pawl and the pawl-plate 29 from the rock-shaft and arm 32 and permitting the latter to move on alone. The rocking of the pawl 31 upon its pivotal support in this manner will cause a projecting shoulder $31^a$ upon the rear end of the pawl to hold the pawl 30 in engagement with the toothed wheel 27, and consequently cause said wheel to be arrested with the pawl-carrying plate and pawls. After the hooked end of the pawl 31 has been disengaged from the shoulder 33 of the arm 32 in the manner above described it will rest upon the outer curved edge of said arm 32 in rear of the shoulder 33, and the movement of the rock-shaft and arm 32 beyond their quarter revolution is not sufficient to carry the arm 32 entirely from under the end of the pawl 31, so that when the rock-shaft and arm 32 are returned to normal position the hook of the pawl 31 will catch over the shoulder 33 as soon as the shoulder is brought under the hook of the pawl, such re-engagement of the pawl with the arm being enforced by the same spring which bears against the tail of the pawl 30, as shown by the dotted lines in Figs. 9 and 10. When the hook of the pawl 31 is engaged with the shoulder 33 of the arm 32, as in Figs. 9 and 10, the extreme upper rear end of the arm 32 bears against the shoulder upon the body of the pawl 31 immediately in front of its pivotal support, so that the arm 32 is confined between said shoulder and the shoulder upon the hooked end of the pawl, and thus in the return of the rock-shaft and arm 32 to normal position the arm 32 will carry the pawls and plate 29 with them as soon as the pawl 31 becomes hooked to the arm 32.

The means for intermittently transferring the amounts added upon one wheel to the next higher wheel in the series may now be described, as follows: Each of the sleeves 50 has fast upon its rear side an upwardly extending spring 53 which bears against the sleeve 45 above it and tends to rock the sleeve 50 rearward, the sleeve 50 being held from movement under the influence of the spring by the engagement of its arm 51 with the shoulder 48 of its co-operating latch arm 47. If the front end of the latch arm be elevated sufficiently to disengage its shoulder 48 from the arm 51 the spring 53 will immediately rock the sleeve 50 and arm 51 rearward. At the extreme left hand end of each sleeve 50, Fig. 8, there is fast upon the shaft 49 a collar which has a pin 54 projecting downwardly and rearwardly from it beneath the left hand end of the pin 52 upon the end of the sleeve 50 immediately to the right of it, and when the latch-arm 47 is lifted and the spring 53 permitted to throw the sleeve 50 and its arm 51 rearward their movement is limited by the engagement of the pin 52 with the pin 54 fast upon the shaft 49. The difference between the normal position of the pin 52 and the position which it occupies when the sleeve 50 has been thrown rearward by the spring 53 and the pin 52 engaged with the pin 54 is just sufficient to permit the rock-shaft 26 and its connected parts to move one-fortieth of a revolution farther forward at a given operation, than is possible when the pin 52 is in normal position; that is to say, the shoulder n of the pawl 31 will not engage the pin 52 in its adjusted position until the parts have moved one-fortieth of a revolution farther than is permitted when the pin 52 stands in normal position. It results from this that whenever a given sleeve 50 is released by its co-operating latch-arm 47 and thrown rearward by its spring 53 then the pawl plate 29 and pawls and toothed wheel 27 and registering wheel 28 are permitted to move one-fortieth of a revolution farther forward than they can ordinarily move, and thus add one more upon the registering wheel. Now, by means hereinafter described, the mode of operation is such that whenever a given registering wheel completes a quarter revolution and brings one of its ciphers to the reading point its co-operating latch-arm 47 will be lifted and the next adjacent sleeve 50 to the left be thereby released and thrown rearward by its spring 53, so that upon the forward movement of the next higher registering wheel in the series and its associated parts they will be permitted to move one extra fortieth of a revolution and thereby add an extra number upon such higher registering wheel.

Each sleeve 45 has fast upon it, in addition to its latch-arm 47, a rearwardly projecting lug or short arm 46, Figs. 7, 8, 9 and 10, and each of the registering wheels 28 has projecting from its right hand side four pins 55, located ninety degrees apart, and adapted to intermittently engage and depress the arm 46 of the co-operating sleeve 45 and thereby lift its latch-arm 47 and release the arm 51 of the next adjacent sleeve 50 to the left, and permitting its spring 53 to set such sleeve 50 in position to permit the extra number to be added upon the next higher registering wheel in the manner above described.

The shaft 49 is a rock-shaft, and when it is rocked forward, by the means hereinafter described, its pins 54 will restore all of the sleeves 50 to normal position and cause their arms 51 to be re-engaged by the latch-arms 47. The shaft 49 has fast upon its right hand end, Figs. 4 and 5, a rearwardly extending arm 65 provided with a pin 66 projecting laterally through the slot in the upper end of a link 63 which is pivoted at its lower end to the bent lever 59 heretofore described. Pivoted to the upper end of the link 63 is a catch arm 67 provided with a notch 68 and having a spring 69 connected to its forward end. When the money drawer is opened the link 36 is drawn downward and the notch 68 in the arm 67 catches over the pin 66, as seen in Fig. 5. When the drawer is closed the catch arm 67 will carry the rear end of the arm 65 forward and rock the shaft 49, to carry the sleeves 50 to normal position, and as the link 63 reaches its upper limit of movement the rear end of the catch-arm 67 will strike a fixed projection 70 upon the side of the framework and be tilted until its notch 68 is disengaged from the pin 66, and the arm 65 released, whereupon the shaft 49 will be rocked back to initial position by the action of a suitable spring not shown.

To prevent shocks and jars from too rapid movement of the rock-shaft 26 and connected parts, under the influence of the actuating springs, the shaft 26 has fast upon its left hand end, Fig. 6, an eccentric $a$ which actuates the rod $b$ of a piston $c$ confined in a cylinder $d$ pivotally supported at its lower end upon a bracket upon the base A. When the drawer is opened, and the shaft 26 rocked forward the piston will be lifted and will prevent too rapid movement of the parts, and when the drawer is closed the piston will be depressed.

Supported by a suitable standard upon the base at the left hand end of the machine is a gong 93 arranged to be sounded by a striker upon an arm 94 pivoted at 96 to the base and provided at its forward end with a pivoted trigger which is free to be swung rearward upon its pivotal support but is held from forward movement by a suitable stop. Upon the side of the money drawer D is a plate 95 adapted to engage the pendent end of this trigger when the drawer is opened and retract the striker-arm 94 against the resistance of a suitable spring, and then release it and permit the spring to throw the striker against the gong. When the drawer is closed the plate 95 simply swings the trigger rearward as it passes and clears it. Secured to one side of the drawer D, Fig. 6, is a horizontal plate 97 provided with a series of vertical holes in which is fitted a series of pins 98 having suitable heads upon their upper ends to sustain them in position, the lower ends of said pins projecting below the plate 97. Pivoted to the side of the drawer compartment in line with these pins is a gravitating pawl 99 whose pointed upper end is adapted to co-operate with the lower ends of the pins as the drawer is opened and closed. When the drawer is opened the pawl 99 will be swung upon its pivot, its pointed upper end bearing against the lower ends of the pins 98 and permitting them to slip freely over it, but preventing any return inward movement of the drawer until it has been opened far enough to carry the plate 97 and all of the pins entirely in front of the pawl. The latter will then swing to normal position, and when the drawer is closed it will be tilted in the opposite direction and the lower ends of the pins will slip over its pointed upper end and prevent any outward movement of the drawer until it has been completely closed. As before stated, the action of the spring 62 connected to the bent lever 59 which bears against the roller 61 upon the rear side of the drawer will serve to throw the latter open when released, but in addition there is pivoted in an opening in the base of the drawer compartment, beneath the drawer, an arm 90 carrying at its rear end a roller bearing against a plate 92 secured to the under side of the drawer, and having connected to it, between its pivotal point and such bearing end, a coiled spring 91, which also aids in throwing the drawer open when released.

Extending across the upper sides of the entire series of registering wheels, Fig. 1, is a plate $f$ provided with openings $g$ over the respective wheels, through which the numbers upon said wheels are singly exposed to view. Said plate also carries upon its under side a series of curved spring plates, one in line with and overlying each of the registering wheels and serving to hide all of the numbers thereon excepting the one exposed through the reading opening $g$.

Having thus fully described our invention, we claim—

1. In an indicating mechanism, the combination of a series of reciprocating indicator supports each provided with a supporting projection and with a locking projection, and a movable bar or plate co-operating with the supporting projections to hold the operated indicator in exposed position, and with the locking projections at the same time to hold the unoperated indicators from movement, while it supports the operated one substantially as described.

2. In an indicating mechanism, the combination of a series of vertically reciprocating indicator slides or supports, each provided with a supporting projection and with a locking projection, and a pivoted plate or bar co-operating with the supporting projections to hold the operated indicator in exposed position, and with the locking projections at the same time to hold the unoperated indicators from movement, while it supports the operated one substantially as described.

3. In an indicating mechanism, the combination of a series of vertically reciprocating indicator slides or supports, each provided with a supporting projection and with a locking projection, and a pivoted spring-pressed plate or bar co-operating with the supporting projections to hold the operated indicator in exposed position, and provided with a locking flange or surface co-operating with the locking projections at the same time to hold the unoperated indicators from movement, while it supports the operated one substantially as described.

4. In an indicating mechanism, the combination of a series of reciprocating indicator supports, each provided with a supporting projection and with a locking projection, a movable bar or plate co-operating with said projections, and means for holding said plate out of the path of the locking projection of the operated indicator and permitting it to move to and remain in position to lock the unoperated indicators, whereby when one indicator in the series has been operated the remaining indicators become locked from movement, substantially as described.

5. In an indicating mechanism, the combination of a series of vertically reciprocating indicator slides or supports, each provided with a supporting projection and with a locking projection above the supporting projection, a pivoted plate or frame adapted to co-operate with the projections and tending to move into the path thereof, and means for holding said plate out of the path of the locking projections until the locking projection of the operated indicator has cleared said plate, whereby when any indicator is operated its locking projection freely passes such plate and the latter is then released and permitted to move unto position to lock the remaining indicators and support the operated indicator, substantially as described.

6. In an indicating mechanism, the combination of a series of vertically reciprocating indicator slides or supports, each provided with a supporting projection and with a locking projection above the supporting projection, a pivoted plate spring-pressed toward the indicator slides and provided with a locking flange or surface adapted to co-operate with the locking projections, and a detaining plate for holding the locking flange or surface of the pivoted plate out of the path of the locking projections and itself standing in the path thereof, whereby when any indicator slide is lifted its locking projection lifts the detaining plate and releases the pivoted plate and permits it to move into position to lock the remaining indicators and to co-operate with the supporting projection of the operated indicator, substantially as described.

7. In an indicating mechanism, the combination of vertically reciprocating indicator slides or supports, each provided with a supporting projection and with a locking projection above the supporting projection, a pivoted spring-pressed plate provided at its upper edge with a locking flange and tending to move into the path of the projection, and a pivoted detaining plate hung above the upper edge of the first mentioned plate and adapted when the latter is moved out of the path of the locking projections upon the indicator slides to drop between it and said slides and to hold said plate out of the path of such projections and to stand itself in the path thereof, whereby when an indicator slide is lifted its locking projection first engages the detaining plate and releases the other plate and permits the latter to move into position to lock the remaining indicator slides from movement and to support the elevated slide, substantially as described.

8. In an indicating mechanism, the combination of a series of sets of vertically reciprocating indicator slides or supports, each slide provided with a supporting projection, a rock-shaft, a series of supporting plates loosely mounted thereon, one for each set of indicator slides and adapted to co-operate with the supporting projections thereof, projections upon the rock-shaft by which all of the plates may be swung out of the path of said projections when the shaft is rocked in one direction, to thereby release all of the exposed indicators, a money drawer and connections between the same and shaft for rocking the latter substantially as described.

9. In an indicating mechanism, the combination of a series of sets of vertically reciprocating indicator slides or supports, each slide being provided with a supporting projection and with a locking projection, a rock-shaft, a series of supporting plates loosely mounted thereon, one for each set of indicator slides and adapted to co-operate with the supporting projections thereon and provided with a locking flange or surface adapted to co-operate with the locking projections, and projections upon the rock-shaft adapted to engage the pivoted plates and swing them out of the path of the projections upon the indicator slides when the shaft is rocked in one direction, to release the exposed indicators and unlock the unoperated slides, substantially as described.

10. In an indicating mechanism, the combination of a series of sets of vertically reciprocating indicator slides or supports, each slide provided with a supporting projection and with a locking projection above the supporting projection, a rock-shaft, a series of plates loosely mounted thereon, one for each set of indicator slides, each plate being spring-pressed toward its co-operating set of slides and adapted to move into the path of the projections thereon, projections upon the rock-shaft adapted to engage the plates and swing them out of the path of the projections when the shaft is rocked in one direction, and means for temporarily holding the plates in such position and releasing them and permitting them to swing into the path of the projections, substantially as described.

11. In an indicating mechanism, the combination of a series of sets of vertically reciprocating indicator slides or supports, each slide provided with a supporting projection and with a locking projection above the supporting projection, a rock-shaft, a series of plates loosely mounted thereon, one for each set of slides and spring-pressed toward the same into the path of the projections thereon, projections upon the rock-shaft adapted to swing the plates out of the path of the projections on the slides when the shaft is rocked in one direction, and a series of detaining plates adapted to engage the first mentioned plates when swung to such position by the rock-shaft and hold them out of the path of the projections, and to be themselves disengaged from such plates by the locking projections of the lifted slides, to release such plates and permit them to swing into position to support the lifted plates and lock the remaining ones, substantially as described.

12. In an indicating mechanism, the combination of a series of sets of vertically reciprocating slides or supports, each slide provided with a supporting projection and with a locking projection above the supporting projection, a series of pivoted plates, one for each set of slides and spring-pressed toward the same into the path of the projections, means for swinging all of said plates out of the path of such projections, a rock-shaft, a series of detaining plates hung thereon and adapted to engage the first mentioned plates when they are swung out of the path of the projections on the slides and hold them in such position, and projections upon the rock-shaft adapted to engage the detaining plates and move them out of engagement with the pivoted plates when the shaft is rocked in one direction, to release such pivoted plates and permit them to swing into the path of the projections upon the slides, substantially as and for the purpose described.

13. In an indicating machine having a forwardly and backwardly sliding money drawer, the combination, with such drawer, a series of reciprocating indicator-supports and a series of pivoted key levers for lifting the supports to indicating position, of a movable supporting plate or bar co-operating with the indicator-supports to hold the operated indicator in exposed position, a spring yieldingly holding said bar or plate in supporting position, and a tripping device interposed between the drawer and such supporting plate and actuated by the opening of the drawer to trip the supporting plate and release the exposed indicator and then permit the plate to return to supporting position under the influence of its spring, substantially as described.

14. In an indicating machine having a forwardly and backwardly sliding money drawer, the combination, with such drawer and a series of reciprocating indicator supports, and a series of pivoted key levers for lifting the supports to indicating position of a movable plate or bar co-operating with such supports to hold the operated indicator in exposed position, a latch for holding the drawer closed, a spring for throwing it open when released, an independent handle or key for operating the latch to release the drawer, and a tripping device intermediate the drawer and the movable supporting plate and actuated by the opening of the drawer to trip the supporting plate and release the exposed indicator, substantially as described.

15. In an indicating machine having a forwardly and backwardly movable money drawer, the combination of a series of sets of reciprocating indicator supports, each support provided with a projection, a series of independently movable plates, one for each set of indicator supports and adapted to co-operate with the projections thereon to hold the operated indicators in exposed position, and means intermediate said plates and the money drawer for simultaneously moving said plates upon the opening of the drawer to release the exposed indicator, substantially as described.

16. In an indicating machine having a forwardly and backwardly movable money drawer, the combination of a series of sets of vertically reciprocating indicator slides or supports, each slide provided with a supporting projection, a rock-shaft, a series of independently movable plates loosely mounted thereon, one for each set of slides and spring-pressed toward the same into position to co-operate with its projections, projections upon the shaft adapted to engage the plates and swing them out of the path of the projections upon the slides when the shaft is rocked in one direction, and connections between the shaft and money drawer for rocking the shaft, substantially as described.

17. In an indicating machine having a forwardly and backwardly movable money drawer, the combination of a series of reciprocating indicator supports each provided with a projection, a movable plate adapted to co-operate with such projections to hold the operated indicator in exposed position, means intermediate the money drawer and such plate for moving the latter at the opening of the drawer to release the exposed indicator, a detaining plate adapted to engage such supporting plate when so moved and hold it out of the path of the projections upon the indicator supports, and means intermediate such detaining plate and the money drawer for disengaging such detaining plate from the supporting plate upon the closing of the drawer, to permit the supporting plate to move into the path of the projections upon the indicator supports, substantially as described.

18. In an indicating machine having a forwardly and backwardly movable money drawer, the combination of a series of reciprocating indicator supports each provided with a supporting projection and with a locking projection, a pivoted supporting and locking plate adapted to co-operate with the supporting projections to hold the operated indicator in exposed position and with the locking projections of the remaining indicators to lock them from movement, means intermediate such plate and the money drawer for moving the plate out of the path of the projections upon the opening of the drawer, to release the exposed indicators and unlock the remaining ones, a detaining plate adapted to engage the supporting and locking plate when so moved and hold it out of locking and supporting position, and means intermediate such detaining plate and the money drawer for moving the plate upon the closing of the drawer to release the supporting and locking plate and permit it to move into the path of the projections upon the indicator supports, substantially as described.

19. In an indicating machine having a forwardly and backwardly movable money drawer, the combination of a series of vertically reciprocating indicator slides or supports each provided with a supporting projection, and with a locking projection above the supporting projection a spring-pressed pivoted plate provided at its upper edge with a locking flange and adapted to rest in the path of the projections upon the slides, means intermediate such pivoted plate and the money drawer for moving the plate out of the path of the projections at the opening of the drawer, a detaining plate adapted to engage the supporting and locking plate when so moved and hold it out of the path of the projections, and means intermediate such detaining plate and the money drawer for disengaging such plate from the supporting and locking plate at the closing of the drawer to permit the latter plate to move into the path of the projections upon the slides, substantially as described.

20. In an indicating machine having a forwardly and backwardly movable money drawer, the combination of a series of sets of reciprocating indicator supports, each support provided with a supporting projection and with a locking projection, a series of independently movable supporting and locking plates, one for each set of indicator supports and adapted to co-operate with the projections thereof to support the operated indicators in exposed position and lock the unoperated ones from movement, and means intermediate said plates and the money drawer for simultaneously moving all of the plates to release the exposed indicators and unlock the unoperated ones, substantially as described.

21. In an indicating machine having a forwardly and backwardly movable money drawer, the combination of a series of sets of reciprocating indicator supports, each support being provided with a supporting projection and a locking projection, a series of spring-pressed movable plates, one for each set and adapted to co-operate with the projections upon the indicator supports, means intermediate such plates and the money drawer for simultaneously moving all of the plates out of the path of the projections, a series of detaining plates adapted to engage the supporting and locking plates when so moved and maintain them out of the path of the projections upon the indicator supports, and means intermediate the detaining plates and money drawer for simultaneously moving all of them to release the supporting and locking plates and permit the latter to move into the path of the projections upon the indicator supports, substantially as described.

22. In an indicating machine having a forwardly and backwardly movable money drawer, the combination of a series of sets of vertically reciprocating indicator slides or supports, each slide being provided with a supporting projection and with a locking projection above the supporting projection, a rock-shaft, a series of spring-pressed supporting and locking plates loosely mounted thereon, one for each set of indicator slides, and adapted to co-operate with the projections thereon, projections upon the rock-shaft adapted to engage such plates and swing them out of the path of the projections upon the slides when the shaft is rocked in one direction, means intermediate such shaft and the money drawer for rocking it upon the opening of the drawer, a second rock-shaft, a series of detaining plates loosely hung thereon, one for each of the supporting and locking plates and adapted to engage the latter when it is swung out of the path of the projections on the indicator slides and maintain it in such position, connections between the detaining plates and their supporting rock-shaft by which the plates are disengaged from the supporting and locking plates when the shaft is rocked in one direction, and means intermediate such rock-shaft and the money drawer for disengaging the detaining plates from the supporting and locking plates at the closing of the money drawer, substantially as described.

23. In an indicating machine having a money drawer, the combination, with a series of reciprocating indicator supports and said drawer, of a locking device for preventing closure of the drawer except when one of the indicator supports has been moved toward indicating position, substantially as described.

24. In an indicating machine having a money drawer, the combination, with such drawer and a series of reciprocating indicator supports, of a locking dog normally standing in the path of the drawer when the latter is open and connected with the indicator supports in such manner as to be moved out of the path of the drawer when any one of the supports is moved toward indicating position, substantially as described.

25. In an indicating machine having a money drawer, the combination, with such drawer and a series of reciprocating indicator supports, of a transverse rod or bar overlying said supports and adapted to be lifted by any one of them, a pivotally supported locking dog located in the path of the drawer and adapted to swing freely upon its pivot in one direction to permit the drawer to open, but held from movement in the opposite direction, to prevent the drawer being closed so long as it stands in the path of the drawer, and a connection between said locking dog and the transverse rod or bar for causing said rod to lift the dog out of the path of the drawer when any one of the indicator supports is operated, substantially as described.

26. In a cash register and indicator having a money drawer, the combination, with the operating keys, of a locking device co-operating therewith and with the money drawer to prevent closing of the latter, after it has been opened, until one of the keys has been operated, substantially as described.

27. In a cash register and indicator having a money drawer, the combination, with such drawer and the operating keys, of a locking dog arranged to project into the path of the drawer after the same has been opened and prevent closing of the same, and adapted to be lifted out of the path of the drawer by the operation of any one of the keys, substantially as described.

28. In a cash register and indicator having a money drawer, the combination, with such drawer and the operating keys, of a transverse movable rod or bar adapted to be lifted by the operation of any one of the keys, a pivoted locking dog located in the path of the drawer and adapted to swing freely upon its pivot in one direction to permit the opening of the drawer, but held from movement in the opposite direction to prevent closing of the drawer so long as it stands in the path of the latter, and a connection between said locking dog and the transverse rod or bar for lifting the dog out of the path of the open drawer upon the operation of any one of the keys, substantially as described.

29. In a cash indicator having a money drawer, the combination of a series of operating key levers, a series of vertically reciprocating indicator slides or supports actuated thereby and each provided with a supporting projection, a pivoted supporting plate co-operating with such projections, a latch for holding the drawer closed, a spring for throwing it open when released, a special key or handle for operating the latch, and means intermediate the drawer and supporting plate for moving the latter out of the path of the projections upon the indicator slides at the opening of the drawer, to release the exposed indicator, substantially as described.

30. In a cash indicator having a money drawer, the combination of a series of operating key levers, a series of vertically reciprocating indicator slides actuated thereby and each provided with a supporting projection and with a locking projection, a pivoted supporting and locking plate adapted to co-operate with such projection, a latch for holding the money drawer closed, a special key or handle for operating the latch to release the drawer, a spring for throwing the drawer open when released, means intermediate the drawer and the supporting plate for moving the latter out of the path of the projections upon the indicator slides at the opening of the drawer, and a detaining plate adapted to engage the supporting and locking plate and maintain it in such position and adapted to be disengaged from the supporting and locking plate by the locking projection of the operated indicator slide, to permit the supporting plate to move into the path of the projections upon the slides to support the lifted one and lock the unoperated ones from movement, substantially as described.

31. In a cash indicator having a money drawer, the combination of a series of sets of operating key levers, a series of sets of vertically reciprocating indicator slides actuated thereby, each slide being provided with a supporting projection and with a locking projection above the supporting projection, a series of spring-pressed supporting and locking plates, one for each set of slides and co-operating with the projections thereon, means intermediate such plates and the money drawer for moving all of them out of the paths of the projections upon the slides at the opening of the drawer, to release the exposed indicators and unlock the unoperated slides, a series of detaining plates adapted to engage the supporting and locking plates when the latter are moved to such position and maintain them out of the path of the projections on the slides, a latch for holding the money drawer closed, a special key or handle for operating the latch to release the drawer, a spring for throwing the drawer open when released, means intermediate the drawer and the supporting and locking plates for moving the latter out of the path of the projections on the slides at the opening of the drawer, and means intermediate the drawer and detaining plates for moving the latter to release the supporting and locking plates at the closing of the drawer, substantially as described.

32. In a cash indicator having a money drawer, the combination of a series of sets of operating key levers, a series of sets of vertically reciprocating indicator slides actuated thereby, each slide being provided with a supporting projection and with a locking projection above the supporting projection, a rock-shaft, a series of supporting and locking plates loosely mounted thereon, one for each set of slides and spring-pressed toward the same into the path of the projections thereon, projections upon the rock-shaft adapted to engage the plates and swing them out of the paths of the projections on the slides when the shaft is rocked in one direction, a latch for holding the money drawer closed, a spring for throwing it open, a key or handle for disengaging the latch from the drawer, means intermediate the drawer and the rock-shaft for rocking the latter to throw the supporting and locking plates out of the paths of the projections on the slides at the opening of the drawer, a series of pivoted detaining plates adapted to engage the respective supporting and locking plates when so moved and maintain them out of the paths of the projections on the slides, a rock-shaft connected with said detaining plates to move them out of engagement with the supporting and locking plates when rocked in one direction, and means intermediate the drawer and such rock-shaft for rocking the latter at the closing of the drawer, substantially as described.

33. In a registering mechanism, the combination of a rotary wheel, an oscillatory actuating pawl therefor, means for holding said pawl out of engagement with the wheel during part of its actuating stroke, and a series of stops co-operating with such means to release the pawl at different points in its stroke and permit it to engage and turn the wheel, substantially as described.

34. In a registering mechanism, the combination of a rotary wheel, an oscillatory pawl-carrier mounted upon the axis of the wheel and carrying a pawl adapted to co-operate with the wheel, means for holding the pawl out of engagement with the wheel during part of the stroke of the pawl-carrier, and a series of stops co-operating with such means to release the pawl at different points in the stroke of the pawl-carrier and permit it to engage the registering wheel, substantially as described.

35. In a registering mechanism, the combination of a rotary wheel, an oscillatory pawl-carrier mounted upon the axis of the wheel and carrying a pawl adapted to actuate the wheel, said pawl carrier having a definite movement at each operation, a graduated oscillatory frame mounted upon the same axis and connected with the actuating pawl to hold the latter out of engagement with the wheel during part of the stroke of the pawl-carrier, and a series of stops co-operating with the graduated frame to arrest the latter at different points and disconnect it from the actuating pawl, to permit the pawl to engage and turn the registering wheel, substantially as described.

36. In a registering mechanism, the combination of a rotary wheel, an oscillatory pawl-carrier mounted upon the axis of the wheel and carrying a pawl adapted to be engaged with the wheel at different points in the uniform strokes of the pawl-carrier, a graduated frame oscillating upon the same axis and connected with the actuating pawl to hold the latter out of engagement with the wheel during part of the stroke of the pawl-carrier, and a series of stops movable into the path of said frame to arrest the latter at different points and disconnect it from the pawl to permit the latter to engage and turn the registering wheel, substantially as described.

37. In a registering mechanism, the combination of a rotary wheel, an oscillatory arm mounted upon the axis of the wheel and having a definite movement at each operation, an oscillatory pawl-carrier mounted upon the same axis, a coupling pawl for connecting the arm and pawl carrier and an actuating pawl carried by the pawl-carrier and adapted to engage the registering wheel at different points in the movement of the pawl-carrier, a graduated oscillatory frame mounted upon the same axis and connected with the pawl to hold the latter out of engagement with the wheel during part of the stroke of the pawl-carrier, and a series of stops movable into the path of the graduated frame to arrest the latter at different points and disconnect it from the pawl and permit the latter to engage and turn the wheel, substantially as described.

38. In a registering mechanism, the combination of a rock-shaft, a rotary wheel loose thereon, an arm fast upon the shaft, a pawl-carrier loose upon the shaft and carrying a pawl adapted to engage and turn the wheel, a coupling pawl for connecting the pawl-carrier and arm, a graduated oscillatory frame hung upon the shaft and connected with the graduated pawl for holding the latter out of engagement with the wheel during part of the movement of the pawl-carrier, and a series of stops movable into the path of the graduated frame to arrest the latter and disconnect it from the actuating pawl at different points to permit the pawl to engage the registering wheel, substantially as described.

39. In a registering mechanism, the combination of a rotary wheel, an oscillatory arm mounted upon the axis of the wheel and having a definite movement at each operation, an oscillatory pawl carrier mounted upon the same axis, an actuating pawl carried thereby and adapted to co-operate with the wheel, a coupling pawl for connecting the pawl carrier and oscillatory arm, a stop co-operating with such coupling pawl to disconnect the arm and pawl-carrier at a fixed point and permit independent movement of the arm, means for holding the actuating pawl out of engagement with the registering wheel during part of the stroke of the pawl-carrier, and a series of stops co-operating with such means to release the pawl at different points and permit it to engage and turn the registering wheel, substantially as described.

40. In a registering mechanism, the combination of a primary and a secondary registering wheel, an actuating device for the secondary wheel, an adjustable stop for limiting the movement of such device, and connections between the primary wheel and such adjustable stop for adjusting the latter at predetermined intervals in the revolutions of the primary wheel to permit extra movement of the actuating device of the secondary wheel for the transfer to the latter of the amount added upon the primary wheel, substantially as described.

41. In a registering mechanism, the combination of a primary and a secondary registering wheel, an oscillatory actuating pawl for the secondary wheel, an adjustable stop for limiting the movement of such pawl, and means intermediate the primary wheel and the stop for adjusting the latter at predetermined intervals in the revolutions of the primary wheel to permit extra movement of the actuating pawl of the secondary wheel, substantially as described.

42. In a registering mechanism, the combination of a primary and a secondary registering wheel, an oscillatory actuating pawl for the secondary wheel, an adjustable stop for limiting the throw of said pawl, a spring tending to move such stop into position to permit extra movement of the pawl, and a latch normally holding the stop against such movement and adapted to be tripped at predetermined intervals in the revolutions of the primary wheel to release the stop and allow its spring to move it into position to permit the extra movement of the actuating pawl, substantially as described.

43. In a registering mechanism, the combination of a primary and a secondary registering wheel, an oscillatory pawl-carrier mounted upon the axis of the secondary wheel and carrying a pawl adapted to engage and turn said wheel, an adjustable stop for limiting the stroke of the pawl-carrier, and connections between such adjustable stop and the primary wheel for adjusting the stop at predetermined intervals in the revolutions of the primary wheel to permit extra movement of the actuating pawl of the secondary wheel, substantially as described.

44. In a registering mechanism, the combination of a primary and a secondary registering wheel, an actuating device for the secondary wheel, an adjustable stop for limiting the movement of such actuating device, a latch for holding the stop in normal position, a spring tending to move the stop into position to permit extra movement of the actuating device, and means intermediate the primary wheel and the latch for tripping the latter at predetermined intervals in the revolutions of the primary wheel, to permit the spring to move the stop into position to permit the extra movement of the actuating device for the secondary wheel, substantially as described.

45. In a registering mechanism, the combination of a primary and a secondary registering wheel, an oscillatory pawl-carrier mounted upon the axis of the secondary wheel and carrying a pawl adapted to engage the wheel at different points in the stroke of the pawl-carrier, determined by the amount to be registered, an adjustable stop for limiting the stroke of the pawl-carrier, and connections between the primary wheel and such stop for adjusting the latter at predetermined intervals in the revolutions of the primary wheel to permit extra movement of the actuating pawl of the secondary wheel and the addition upon the latter of the amount registered by the primary wheel, substantially as described.

46. In a registering mechanism, the combination of a primary and a secondary registering wheel, an oscillatory pawl-carrier mounted upon the axis of the secondary wheel and carrying a pawl co-operating with the wheel, means for holding the pawl out of engagement with the wheel during part of the stroke of the pawl carrier, and a series of stops co-operating with such means to release the pawl at different points and permit it to engage the registering wheel, an adjustable stop for limiting the stroke of the pawl-carrier, and means intermediate the primary wheel and such stop for adjusting the latter at predetermined intervals in the revolutions of the primary wheel to permit extra movement of the pawl-carrier and the addition upon the secondary wheel of the amount registered by the primary wheel, substantially as described.

47. In a registering mechanism, the combination of a primary and a secondary registering wheel, an oscillatory pawl-carrier mounted upon the axis of the secondary wheel and carrying a pawl adapted to co-operate with such wheel, means for holding the pawl out of engagement with the wheel during part of the stroke of the pawl-carrier, and a series of stops co-operating with such means to release the pawl at different points and permit it to engage the registering wheel, an adjustable stop for limiting the stroke of the pawl-carrier, a latch for holding the stop in normal position and a spring tending to move it out of normal position to permit extra movement of the pawl-carrier, and means intermediate the primary wheel and the latch for tripping the latter to release the stop and permit its spring to move it into position to allow the extra movement of the pawl-carrier, substantially as described.

48. In a registering mechanism, the combination of a primary and a secondary registering wheel, an oscillatory pawl carrier mounted on the axis of the secondary wheel and carrying a pawl adapted to co-operate with the wheel, an oscillatory graduated frame also mounted upon the axis of said wheel and connected with the pawl to move with it during part of the stroke of the pawl carrier and hold it out of engagement with the registering wheel, a series of stops movable into the path of such graduated frame, to arrest the latter at different points and disconnect it from the pawl and permit the latter to engage the registering wheel, an adjustable stop for limiting the stroke of the pawl-carrier, a latch for holding the stop in normal position, a spring tending to move the stop into position to permit extra movement of the pawl-carrier, and means intermediate the primary wheel and the latch for tripping the latter at predetermined intervals in the revolutions of the primary wheel, to release the stop and allow it to move into position to permit the extra movement of the pawl-carrier, substantially as described.

49. In a registering mechanism, the combination of a series of registering wheels, an oscillatory actuating pawl for each wheel, an adjustable stop for limiting the movement of each pawl, means intermediate the adjustable stop for each pawl and the preceding wheel in the series for adjusting the stop at predetermined intervals in the revolutions of such preceding wheel to permit extra movement of the pawl, and means common to all of the adjustable stops for resetting them to normal position, substantially as described.

50. In a registering mechanism, the combination of a series of registering wheels, an oscillatory actuating pawl for each wheel, an adjustable stop for each pawl, to limit its movement, a spring for each stop tending to move it to position to permit extra movement of its co-operating pawl, a latch for holding the stop in normal position adapted to be tripped at predetermined intervals in the revolutions of the preceding wheel in the series to release the stop and permit it to be moved by its spring into position to allow extra movement of its co-operating pawl, and means common to all of the stops for resetting them to normal position and re-engaging them with their latches.

51. In a registering machine having a forwardly and backwardly movable money drawer, the combination of a rotary registering wheel, an actuating pawl therefor oscillated forward and backward by the opening and closing of the money drawer, means for holding said pawl out of engagement with the wheel during part of its stroke, and a series of stops co-operating with such means to release the pawl at different points in its stroke and permit it to engage and turn the registering wheel, substantially as described.

52. In a registering machine having a forwardly and backwardly movable money drawer, a latch for holding the same closed, a spring for throwing it open when released, a key for operating the latch to release the drawer, in combination with a rotary registering wheel, an actuating pawl therefor oscillated forward and backward by the opening and closing of the drawer, means for holding the pawl out of engagement with the registering wheel during part of its stroke, and a series of stops co-operating with such means to release the pawl at different points in its stroke to permit it to engage and turn the registering wheel, substantially as described.

53. In a registering machine having a forwardly and backwardly movable money drawer, the combination of a rock-shaft oscillated forward and backward by the opening and closing of the drawer, a series of rotary registering wheels mounted upon said shaft, an oscillatory pawl carrier for each registering wheel, mounted upon the shaft and oscillated thereby and carrying an actuating pawl adapted to engage the registering wheel, means co-operating with each pawl to hold it out of engagement with its registering wheel during part of its stroke, and a series of stops co-operating with such means to release the pawl at different points in its stroke and permit it to engage and turn the registering wheel, substantially as described.

54. In a cash register having a forwardly and backwardly movable money drawer, the combination of a horizontal plate or frame provided with a series of vertical holes containing a series of pins projecting beneath said plate and forming a horizontal rack at the under side thereof, and a pawl co-operating with said pins, said plate and pawl being fixed one to the drawer and the other to the side of its compartment or other stationary support, and co-operating with each other to compel a definite movement of the drawer in each direction, substantially as described.

55. In a cash register having a forwardly and backwardly movable money drawer, the combination of a horizontal plate or frame secured to the side of the drawer and provided with a series of vertical holes containing pins projecting below said plate and forming a rack upon its under side, and a pawl pivoted to the side of the drawer compartment and co-operating at its upper end with said pins, to compel a definite movement of the drawer in each direction, substantially as described.

In testimony whereof we have hereunto set our hands this 30th day of January, A. D. 1891.

WILLIAM W. WYTHE.
WILLIAM H. WYTHE.

In presence of—
MAUDE E. WYTHE,
THOMAS S. IRVIN.